United States Patent
Ellis et al.

(10) Patent No.: US 8,313,622 B2
(45) Date of Patent: Nov. 20, 2012

(54) ELECTROCHEMICAL ANODES HAVING FRICTION STIR WELDED JOINTS AND METHODS OF MANUFACTURING SUCH ANODES

(75) Inventors: Timothy W. Ellis, Dallas, TX (US); Matthew Burr, Irving, TX (US); Elton Jones, Heath, TX (US)

(73) Assignee: RSR Technologies, Inc., Dallas, TX (US)

( * ) Notice: Subject to any disclaimer, the term of this patent is extended or adjusted under 35 U.S.C. 154(b) by 135 days.

(21) Appl. No.: 12/833,711

(22) Filed: Jul. 9, 2010

(65) Prior Publication Data

US 2012/0006679 A1    Jan. 12, 2012

(51) Int. Cl.
*C25B 9/02* (2006.01)
*C25B 11/02* (2006.01)
*C25B 11/04* (2006.01)
*C25B 11/16* (2006.01)

(52) U.S. Cl. .......... 204/288; 204/286.1; 204/297.01; 204/281

(58) Field of Classification Search .......... 204/281, 204/286.1, 288, 297.01
See application file for complete search history.

(56) References Cited

U.S. PATENT DOCUMENTS

| | | | | |
|---|---|---|---|---|
| 5,172,850 | A | * 12/1992 | Prengaman et al. | 228/176 |
| 5,813,592 | A | 9/1998 | Midling et al. | |
| 6,131,798 | A | * 10/2000 | Prengaman | 228/139 |
| 6,325,273 | B1 | 12/2001 | Boon et al. | |
| 7,003,868 | B2 | * 2/2006 | Preimesberger | 29/746 |
| 2002/0046864 | A1 | 4/2002 | Bellino et al. | |
| 2009/0127126 | A1 | * 5/2009 | Torvund | 205/385 |

FOREIGN PATENT DOCUMENTS

WO    WO-2005/080641 A1    9/2005

OTHER PUBLICATIONS

International Search Report and Written Opinion of the International Searching Authority (European Patent Office) for International Patent Application No. PCT/US2011/043349, Nov. 17, 2011.

* cited by examiner

*Primary Examiner* — Bruce Bell
(74) *Attorney, Agent, or Firm* — K&L Gates LLP

(57) ABSTRACT

An electrochemical anode is formed using friction stir welded (FSW) joints. A FSW joint may be formed between the bus bar and anode sheet or the lead encapsulation and anode sheet. The FSW joints may also comprise fillet and butt joints. FSW joints may also be utilized to seal the ends of the electrochemical anodes to prevent corrosion.

26 Claims, 4 Drawing Sheets

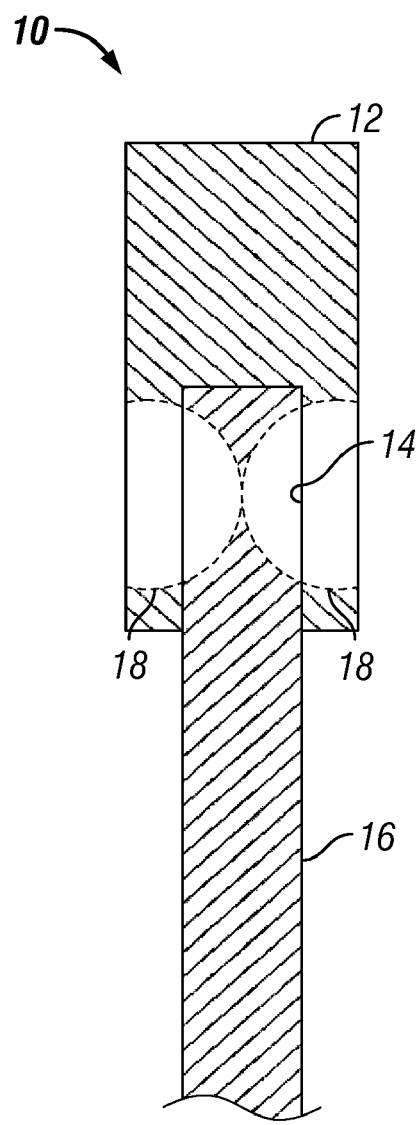
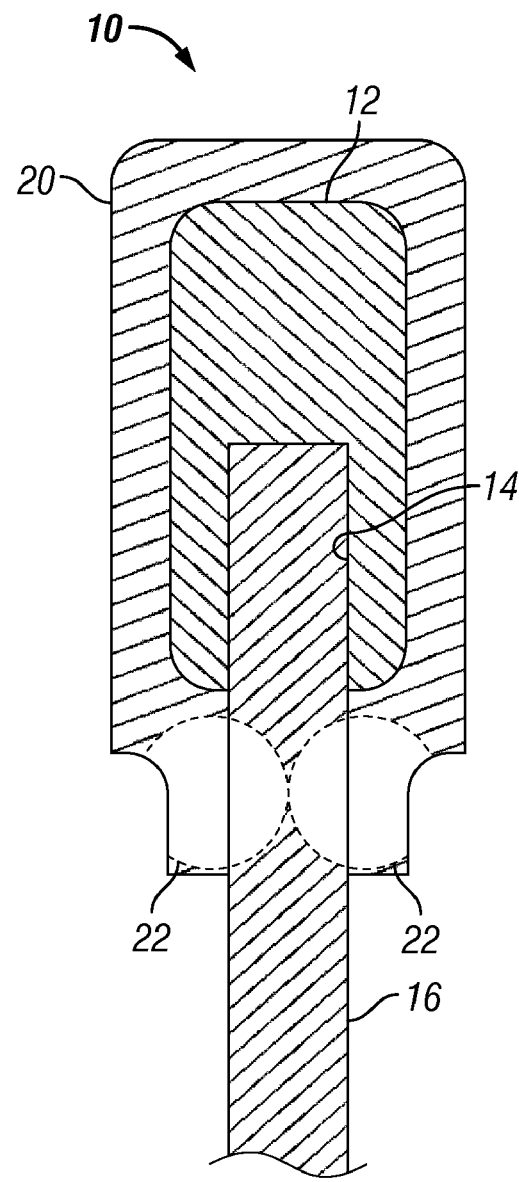
FIG. 1      FIG. 2

PROCESS PARAMETERS, LOADS AND OBSERVATIONS

| WELD ID | RPM | IPM | TOOL X FORCE | TOOL Y FORCE | TOOL Z FORCE | SHOULDER DIAMETER | RESULTANT VECTOR | WELD TYPE | POSITION/ LOAD CONTROL | APPEARANCE |
|---|---|---|---|---|---|---|---|---|---|---|
| 1 | 300 | 12 | 150 | -100 | 650 | 1.125 | 675 | BEAD | POSITION-LOAD | POOR |
| 2 | 400 | 16 | 130 | -150 | 915 | 1.125 | 936 | BEAD | POSITION-LOAD | POOR |
| 3 | 500 | 18 | 150 | -150 | 975 | 1.125 | 998 | BEAD | LOAD-TRIMMED | POOR |
| 4 | 400 | 16 | 110 | -65 | 950 | 1.125 | 959 | BEAD | LOAD | GOOD |
| 5 | 300 | 16 | 85 | -65 | 950 | 1.125 | 956 | BEAD | LOAD-TRIMMED | FAIR |
| 6 | 400 | 18 | 180 | -200 | 850 | 1.125 | 892 | BEAD | LOAD | FAIR |
| 7 | 350 | 14 | 80 | -50 | 1270 | 1.125 | 1273 | BEAD | POSITION-LOAD | GOOD |
| 8 | 350 | 18 | 130 | -120 | 1200 | 1.125 | 1213 | BEAD | POSITION-LOAD | GOOD |
| 9 | 450 | 18 | 90 | -80 | 975 | 1.125 | 982 | BEAD | POSITION-LOAD | FAIR |
| 10 | 350 | 18 | 185 | -125 | 1050 | 1.000 | 1073 | BEAD | POSITION-LOAD | POOR |
| 11 | 450 | 18 | 70 | -50 | 875 | 1.000 | 879 | BEAD | POSITION-LOAD | POOR |
| 12 | 550 | 18 | 190 | -225 | 1250 | 1.000 | 1284 | BEAD | POSITION-LOAD | BAD |
| 13 | 400 | 16 | 180 | -180 | 950 | 1.125 | 984 | BUTT | LOAD | GOOD |
| 14 | 400 | 20 | 130 | -130 | 1650 | 1.125 | 1660 | BUTT | POSITION | FLASHY (GOOD) |
| 15 | 400 | 20 | 175 | -100 | 850 | 1.125 | 874 | BUTT | LOAD-TRIMMED | GOOD |
| 16 | 400 | 20 | 170 | -150 | 965 | 1.125 | 991 | BUTT | LOAD-TRIMMED | FLASHY (GOOD) |
| 17 | 400 | 20 | 185 | -160 | 950 | 1.125 | 981 | BUTT | LOAD | GOOD |

*FIG. 7*

ELECTROCHEMICAL ANODES HAVING FRICTION STIR WELDED JOINTS AND METHODS OF MANUFACTURING SUCH ANODES

FIELD OF THE INVENTION

In general, the present invention relates to lead anodes used in electrochemical processes, particularly in the mining industry, and, more specifically, to the production of such anodes using friction stir welding.

BACKGROUND OF THE INVENTION

According to conventional practice, joints in lead anodes used in the mining industry are formed using traditional lead burning procedures (e.g., torch welding) in which lead is melted by hand to form the welds or joints. There are, however, a number of disadvantages associated with conventional lead burning procedures as will be discussed below.

Conventional lead burning procedures involve a high degree of risk to the worker. First, the heat generated during creation of the weld can result in worker injury. Second, during melting of the lead, the ambient levels of lead can rise to toxic levels. If inhaled, it could lead to lead poisoning, one of the oldest forms of occupational hazards. As a result, a variety of bodily processes are affected, as well as the deterioration of numerous organs such as the heart, bones, intestines, kidneys, and reproductive and nervous systems.

Conventional lead burning procedures often produce anodes having defective welds which have repeatedly lead to product failure. By training and using a specially skilled work force, the potential for defective welds can be reduced, but is not eliminated, as incomplete welds can occur despite use of skilled workers. In these incomplete welds, the joint visually appears sound. However, the two melt pools created to form the weld have never merged, thereby greatly reducing the material available in the anode joint for current transport and creep (i.e., deformation) resistance.

Even when an anode having a defect-free joint is created, conventional lead burning procedures create an undesirable heat affected zone in the base metal structure around the region of the anode joint. In this heat affected region, the grain structure of the materials in the anode is altered by the heat used to create the joint. The altered grain structure can be a further source of reduced corrosion resistance and decreased creep resistance.

Moreover, lead and copper (used to create anodes) do not naturally weld together. As such, various techniques, such as soldering, are utilized in conventional lead burning procedures to join the lead and copper, thereby constructing the anode. Therefore, in addition to the foregoing disadvantages, conventional anode manufacturing processes are more costly due to the increased manufacturing time and materials involved in joining the lead and copper.

Accordingly, since conventional lead burning techniques used to produce anodes are rife with problems, companies must devote costly resources to safety, worker training, quality control testing, and manufacturing. To date, conventional lead burning techniques have failed to adequately address these issues in the anode industry.

In view of the foregoing, there is a need in the art for an anode manufacturing technique which greatly reduces or eliminates the disadvantages of the prior art.

SUMMARY OF THE INVENTION

According to the present invention, the disadvantages of conventional lead burning techniques used to produce anodes are avoided or reduced by providing electrochemical anodes having joints created using friction stir welding (sometimes referred to as FSW). Embodiments of the present invention provide electrochemical anodes comprising a bus bar and anode sheet electrically coupled thereto. Friction stir welded joints are utilized to construct the electrochemical anodes.

Because there is no melted lead material in friction stir welding, both workforce exposure to lead vapors and lead vapor release into the environment are reduced or eliminated. Through utilization of friction stir welding to produce anodes, worker safety is further enhanced as the process does not involve use of heat or require workers to risk injury by being close to the weld during its creation. Moreover, friction stir welding reduces the potential for formation of defective joints in the anodes since friction stir welding can be automated, thereby eliminating variability occasioned by manual procedures. Additionally, friction stir welding produces a more uniform through thickness weld without the defects caused by failure of the melt pools to fully merge. Friction stir welding also results in a smaller heat affected zone and in less severe alteration of the grain structure of the anode materials.

Employing the present invention will also allow for better quality control. It has been shown that the quality and reliability of friction stir welding processes greatly reduces or eliminates the need for quality control testing. As an additional benefit, through utilization of the present invention, the use of non-destructive evaluation techniques, such as ultrasonic weld inspection, are available in lead joining—these evaluation techniques are unavailable in conventional lead burning procedures.

Because friction stir welding creates a less defective anode, reduces the labor required, and reduces the potential for exposure to hazardous materials, the costs of anode production will be reduced, worker safety will be enhanced, and customer complaints will be minimized.

BRIEF DESCRIPTION OF THE DRAWINGS

FIGS. 1-4, 6A, and 6B are sectional views of anodes constructed using friction stir welding according to exemplary embodiments of the present invention;

FIG. 7 is a chart detailing process parameters and loads utilized in the production of anodes according to exemplary embodiments of the present invention.

DETAILED DESCRIPTION OF THE INVENTION

Figure 3:
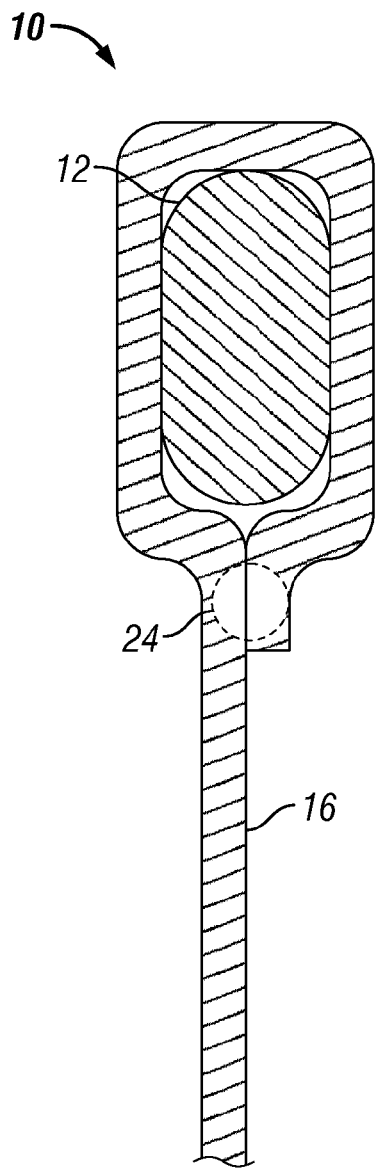

Illustrative embodiments and methodologies of the present invention are described below as they might be employed in an anode manufactured using friction stir welding ("FSW") or a method of manufacturing such anodes. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the present invention will become apparent from consideration of the following description and drawings.

FIG. 1 illustrates an exemplary embodiment of an electrochemical anode according to the present invention. Anode 10 includes a copper bus bar 12 having a groove 14. Although described as a copper bus bar, please note those ordinarily skilled in the art having the benefit of this disclosure realize other material may be utilized such as, for example, copper coated steel, steel, aluminum or titanium. A lead anode sheet 16 is inserted into bus bar slot 14. An exemplary anode can also be those as disclosed in U.S. Pat. Nos. 5,172,850 and 6,131,798, each being hereby incorporated by reference in their entirety (however, as will be described, the need to solder the joints is alleviated through use of the present invention).

Further referring to FIG. 1, lead anode sheet 16 fits tightly into bus bar slot 14. However, unlike the prior art methods of fixing the sheet and bus bar to one another using conventional burning techniques, in the present invention copper bus bar 12 and lead anode sheet 16 are joined using friction stir welding. According to friction stir welding procedures, surfaces to be joined are rubbed with a rotating probe of harder material. As a consequence of the rubbing, heat is generated causing the surfaces to become partially plasticized. These plasticized surfaces solidify together upon cooling, thus creating a bond or joint. Generally, the probe maintains intimate contact with both surfaces to be joined as it is moved along the joint. In this way a more uniform joint can be created. Those ordinarily skilled in the art having the benefit of this disclosure realize a variety of friction stir welding methods may be implemented using the present invention.

Further referring to the exemplary embodiment of FIG. 1, anode 10 is friction stir welded along regions 18. A friction stir welding probe (not shown) is applied to form a joint between the lower edge of the copper bus bar 12 and the lead anode sheet 16. In this exemplary embodiment, the FSW probe (not shown) welds through the bus bar 12, and to the lead anode sheet 16 held in the bus bar slot 14. As such, lead anode sheet 16 and copper bus bar 16 are joined within bus bar slot 14. As illustrated, bus bar 12 is friction stir welded on both sides at regions 18. However, those ordinarily skilled in the art having the benefit of this disclosure realize this and subsequent embodiments may be welded on one side only, resulting in increased time efficiency. After anode 10 is welded, it may be overlaid with lead as understood in the art.

FIG. 2 illustrates another exemplary embodiment of an anode 10 according to the present invention. Lead anode sheet 16 is inserted into slot 14 of copper bus bar 12 as previously described in relation to FIG. 1. However, in this exemplary embodiment, anode 10 is overlaid with lead encapsulation 20 in order to prevent corrosion of anode 10 caused by the electrochemical solution used in the cell, which is usually acid based (e.g. H2SO4). Thereafter, anode 10 is friction stir welded along regions 22, which bonds lead encapsulation 20 to lead anode sheet 16.

FIG. 3 illustrates another exemplary embodiment of anode 10 according to the present invention whereby a friction stir welded joint is used to create a joint formed by a back folded or wrapped extension of anode sheet 16. Here, lead anode sheet 16 is wrapped around copper bus bar 12 contacting itself below copper bus bar 12, thereby encapsulating the bus bar 12. The backfolding of lead sheet 16 eliminates the necessity for secondary operations (i.e., casting or electroplating to develop the lead encapsulation) and only requires one weld. Thereafter, anode 10 is friction stir welded along region 24, thereby bonding lead anode sheet 16 to itself.

Figure 4:
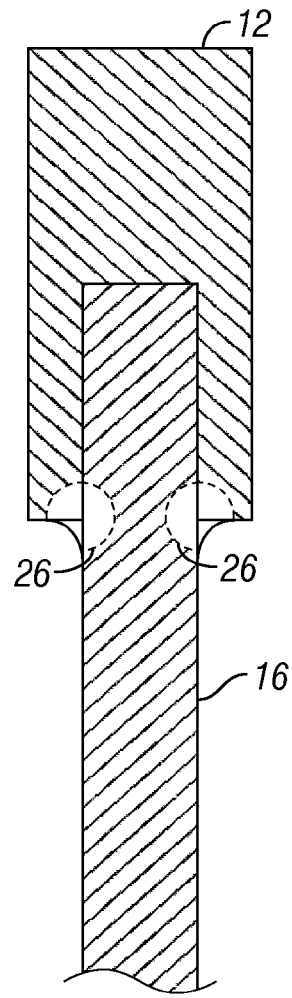

FIG. 4 illustrates another exemplary embodiment of anode 10 according to the present invention. Here, anode sheet 16 is again inserted into slot 14 of bus bar 12. However, a friction stir welded fillet weld is applied to the region 26 where the lower end of bus bar 12 meets anode sheet 16. A filler material, such as lead (Pb) or Pb-Antimony (Sb) alloy (1 wt %-11 wt %, may be incorporated into the fillet weld due to their low corrosion. The fillet weld seals the joint between bus bar 12 and sheet 16 to prevent solution migration and corrosion in the bar/blade contact area.

Figure 5:
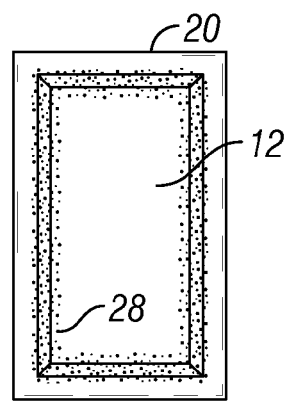
FIG. 5. illustrates an end of an anode which has been sealed using friction stir welding according to an exemplary embodiment of the present invention.

FIG. 5 illustrates how the end of anode 10 may be sealed to prevent corrosion according to another exemplary embodiment of the present invention. If corrosion were allowed to occur, mechanical and electrical discontinuity of the bus bar lead joint may limit performance of anode 10. In this embodiment, as described in relation to FIG. 2, copper bus bar 12 is encapsulated with lead encapsulation 20. At the joint were copper bus bar 12 and lead encapsulation 20 meet (region 28), friction stir fillet welding is utilized in order to seal bar 12, thereby preventing corrosion under lead encapsulation 20. Anode sheet 16 (not shown) is then friction stir welded to lead encapsulation 20 using, for example, a butt weld as will be described below.

Figure 6A:
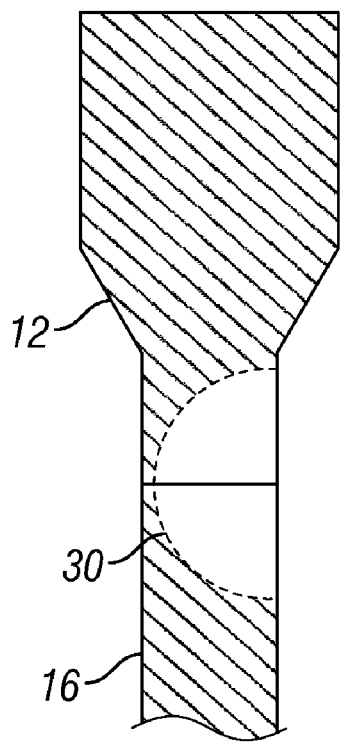
Figure 6B:
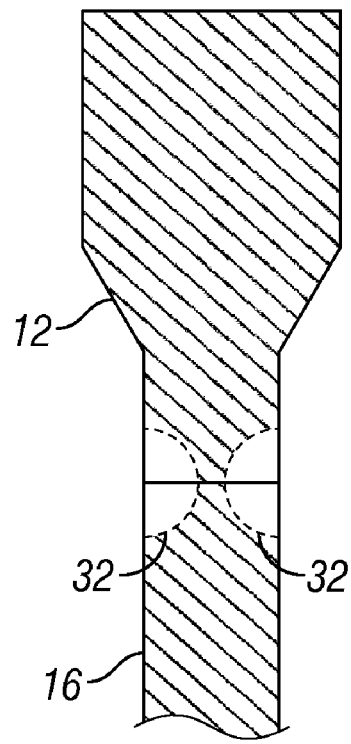

FIGS. 6A & 6B illustrate an anode which has been butt welded according to exemplary embodiments of the present invention. In FIG. 6A, lead has been cast around copper bus bar 12. Lead anode sheet 16 is attached to the bottom of bus bar 12 using a friction stir butt weld at region 30. As illustrated, only one side of the joint is welded, resulting in time efficiency. FIG. 6B, however, illustrates the same embodiment except that the joint has been friction stir butt welded on both sides at regions 32.

EXAMPLE

FIG. 7 is a chart which provides process parameters and loads for friction stir welds having good visual appearance according to exemplary embodiments of the present invention. Testing was conducted on 11 mm (0.43-in.) thick lead plates to determine the process loads and preliminary machine tool requirements for production friction stir welding operations. Process loads of interest included normal load (z-load), in plane loads (x,y), and the spindle torque. The lead plates utilized included a quantity of 10-4" wide plates and 4-6" wide plates.

The fixturing used to weld the lead plates was not purpose built and utilized simple finger clamps on a steel anvil. The faying surfaces and adjacent areas were degreased using a solvent wipe immediately prior to welding. A total of 17 welds were made. Of the 17 welds, 12 were made using a bead on plate configuration with the remainder made in a butt joint configuration for verification of the process loads in either configuration. Based on a weld productivity rates, a target speed was determined to be 20 inches per minute (ipm). This speed is based on a 1.5-m (59-in.) weld length with 10 welds produced in an hour, and approximately 30 minutes of that time used for setup and weld preparation. This cycle time would allow for a weld to finish every 6 minutes including setup.

The results are illustrated in the chart of FIG. 7. Normal loads (z-forces) for these exemplary welds in both configurations were below 1200 lbs and planar loads (x and y) were below 250 lbs. The spindle torque feedback was typically too small to quantify. FIG. 7 is a table of the process loads, process parameters, and general observations of each weld.

As can be seen, welds with a good visual appearance could be made at, for example, 20 ipm with normal forces below 1000 lbs.

In addition, metallography was performed to compare the friction stir link welds to the conventional welds. The friction stir welds were found to be through thickness (i.e., the depth through the weld (through the thickness of the sheet/bar joint)) and have a smaller grain structure than that of the conventional samples which did not have complete penetration. As such, the grain structure produced using the present invention is very fine, thereby producing an anode having superior mechanical properties and corrosion resistance.

Accordingly, the work done illustrates how friction stir welding can be used to replace conventional lead burning in the production of anodes for the mining industry. Its adoption will lead to improvements in worker and environmental safety, quality of product, and a reduced per anode cost.

Embodiments of the present invention provide an electrochemical anode comprising: a bus bar; an anode sheet electrically coupled to the bus bar; and a first friction stir welded joint utilized to join the electrochemical anode. In another embodiment, the first friction stir welded joint extends along the electrochemical anode, the first friction stir welded joint penetrating the bus bar and anode sheet on a first side of the electrochemical anode, the electrochemical anode further comprising a second friction stir welded joint extending along the electrochemical anode, the second friction stir welded joint penetrating the bus bar and anode sheet on a second side of the electrochemical anode.

In yet another exemplary embodiment, the electrochemical anode further comprises a lead encapsulation extending around the bus bar and contacting a portion of the anode sheet, the first friction stir welded joint extending along the electrochemical anode and penetrating the lead encapsulation and anode sheet on a first side of the electrochemical anode; and a second friction stir welded joint extending along the electrochemical anode, the second friction stir welded joint penetrating the lead encapsulation and anode sheet on a second side of the electrochemical anode. In another embodiment, the anode sheet is wrapped around the bus bar such that a top end of the anode sheet contacts a portion of the anode sheet located below the bus bar, wherein the first friction stir welded joint penetrates the top end and the portion of the anode sheet.

In yet another exemplary embodiment, the first friction stir welded joint is a fillet welded joint which penetrates the anode sheet and bus bar on a first side of the electrochemical anode, the electrochemical anode further comprising a second friction stir welded joint which penetrates the anode sheet and bus bar on a second side of the electrochemical anode, the second friction stir welded joint also being a fillet welded joint. In another embodiment, the electrochemical anode further comprises a lead encapsulation around the bus bar, wherein the electrochemical anode is sealed at each end using a friction stir welded joint located along an area where the bus bar and lead encapsulation meet. In yet another embodiment, the first friction stir welded joint is a butt welded joint which joins the bus bar and anode sheet. In yet another embodiment, the first friction stir welded joint is a butt welded joint which penetrates the anode sheet and bus bar on a first side of the electrochemical anode, the electrochemical anode further comprising a second friction stir welded joint which penetrates the anode sheet and bus bar on a second side of the electrochemical anode, the second friction stir welded joint also being a butt welded joint.

An exemplary methodology of the present invention provides a method of making an electrochemical anode, the method comprising the steps of: (a) providing an anode sheet; (b) electrically coupling the anode sheet to a bus bar; and (c) forming the electrochemical anode using a first friction stir welded joint. In yet another methodology, step (c) further comprises the steps of forming the first friction stir welded joint along the electrochemical anode, the first friction stir welded joint penetrating the bus bar and anode sheet on a first side of the electrochemical anode; and forming a second friction stir welded joint along the electrochemical anode, the second friction stir welded joint penetration the bus bar and anode sheet on a second side of the electrochemical anode.

In yet another exemplary methodology, the method further comprises the steps of providing a lead encapsulation extending around the bus bar and contacting a portion of the anode sheet; forming the first friction stir welded joint along the electrochemical anode, wherein the first friction stir welded joint penetrates the lead encapsulation and anode sheet on a first side of the electrochemical anode; and forming a second friction stir welded joint along the electrochemical anode, wherein the second friction stir welded joint penetrates the lead encapsulation and anode sheet on a second side of the electrochemical anode. In another method, step (b) comprises the step of wrapping the anode sheet around the bus bar such that a top end of the anode sheet contacts a portion of the anode sheet located below the bus bar, wherein the first friction stir welded joint penetrates the top end and the portion of the anode sheet.

In yet another exemplary methodology, step (c) further comprises the steps of forming the first friction stir welded joint as a fillet welded joint which penetrates the anode sheet and bus bar on a first side of the electrochemical anode; and forming a second friction stir welded joint as a fillet welded joint which penetrates the anode sheet and bus bar on a second side of the electrochemical anode. In another methodology, the method further comprises the step of encapsulating the bus bar with lead; and sealing the anode sheet at each end using a friction stir welded joint located along an area where the bus bar and lead encapsulation meet. In another methodology, the first friction stir welded joint is a butt welded joint which joins the bus bar and anode sheet. In yet another exemplary embodiment, the method further comprises the steps of forming the first friction stir welded joint as a butt welded joint which penetrates the anode sheet and bus bar on a first side of the electrochemical anode; and forming a second friction stir welded joint as a butt welded joint which penetrates the anode sheet and bus bar on a second side of the electrochemical anode.

While the invention is susceptible to various modifications and alternative forms, specific embodiments have been shown by way of example in the drawings and has been described in detail herein. However, it should be understood that the invention is not intended to be limited to the particular forms disclosed. For example, those ordinarily skilled in the art having the benefit of this disclosure realize anodes having other configurations may be formed in accordance with the present invention with friction stir welding used to join lead anodes to abutting surfaces in lieu of lead burning procedures. As such, the intention is to cover all modifications, equivalents, and alternatives falling within the spirit and scope of the invention as defined by the appended claims.

What is claimed is:

1. An electrochemical anode comprising:
a bus bar;
an anode sheet electrically coupled to the bus bar, the anode sheet comprising lead; and
a first friction stir welded joint connecting the anode sheet to the bus bar, thereby electrically coupling the anode sheet to the bus bar.

2. An electrochemical anode as defined in claim 1, wherein the first friction stir welded joint extends along the electrochemical anode, the first friction stir welded joint penetrating the bus bar and anode sheet on a first side of the electrochemical anode, the electrochemical anode further comprising a second friction stir welded joint extending along the electrochemical anode, the second friction stir welded joint penetrating the bus bar and anode sheet on a second side of the electrochemical anode.

3. An electrochemical anode as defined in claim 1, the electrochemical anode further comprising:
 a lead encapsulation extending around the bus bar and contacting a portion of the anode sheet, the first friction stir welded joint extending along the electrochemical anode and penetrating the lead encapsulation and anode sheet on a first side of the electrochemical anode; and
 a second friction stir welded joint extending along the electrochemical anode, the second friction stir welded joint penetrating the lead encapsulation and anode sheet on a second side of the electrochemical anode.

4. An electrochemical anode as defined in claim 1, wherein the anode sheet is wrapped around the bus bar such that a top end of the anode sheet contacts a portion of the anode sheet located below the bus bar, wherein the first friction stir welded joint penetrates the top end and the portion of the anode sheet.

5. An electrochemical anode as defined in claim 1, wherein the first friction stir welded joint is a fillet welded joint which penetrates the anode sheet and bus bar on a first side of the electrochemical anode, the electrochemical anode further comprising a second friction stir welded joint which penetrates the anode sheet and bus bar on a second side of the electrochemical anode, the second friction stir welded joint also being a fillet welded joint.

6. An electrochemical anode as defined in claim 1, the electrochemical anode further comprising a lead encapsulation around the bus bar, wherein the electrochemical anode is sealed at each end using a friction stir welded joint located along an area where the bus bar and lead encapsulation meet.

7. An electrochemical anode as defined in claim 1, wherein the first friction stir welded joint is a butt welded joint which joins the bus bar and anode sheet.

8. An electrochemical anode as defined in claim 1, wherein the first friction stir welded joint is a butt welded joint which penetrates the anode sheet and bus bar on a first side of the electrochemical anode, the electrochemical anode further comprising a second friction stir welded joint which penetrates the anode sheet and bus bar on a second side of the electrochemical anode, the second friction stir welded joint also being a butt welded joint.

9. An electrochemical anode as defined in claim 1, wherein the anode sheet is friction stir welded directly to the bus bar, the bus bar comprising copper.

10. An electrochemical anode as defined in claim 1, wherein the anode sheet is friction stir welded to an overlay encapsulating the bus bar, the bus bar comprising copper, and the overlay comprising lead.

11. An electrochemical anode as defined in claim 1, wherein the anode sheet is wrapped around the bus bar, and the wrapped anode sheet is friction stir welded to itself, thereby encapsulating the bus bar, the bus bar comprising copper.

12. An electrochemical anode as defined in claim 1, further comprising a filler material incorporated into a friction stir welded fillet joint between the anode sheet and the bus bar, the bus bar comprising copper, and the filler material comprising lead or a lead antimony alloy.

13. An electrochemical anode as defined in claim 1, wherein the anode sheet is attached to the bus bar using one or more friction stir butt welds, the bus bar comprising copper.

14. A method of making an electrochemical anode, the method comprising the steps of:
 (a) providing an anode sheet comprisinq lead; and
 (b) forming a first friction stir welded joint connecting the anode sheet to a bus bar, thereby electrically coupling the anode sheet to the bus bar.

15. A method of making an electrochemical anode as defined in claim 14, wherein step (b) further comprises the steps of:
 forming the first friction stir welded joint along the electrochemical anode, the first friction stir welded joint penetrating the bus bar and anode sheet on a first side of the electrochemical anode; and
 forming a second friction stir welded joint along the electrochemical anode, the second friction stir welded joint penetration the bus bar and anode sheet on a second side of the electrochemical anode.

16. A method of making an electrochemical anode as defined in claim 14, the method further comprising the steps of:
 providing a lead encapsulation extending around the bus bar and contacting a portion of the anode sheet;
 forming the first friction stir welded joint along the electrochemical anode, wherein the first friction stir welded joint penetrates the lead encapsulation and anode sheet on a first side of the electrochemical anode; and
 forming a second friction stir welded joint along the electrochemical anode, wherein the second friction stir welded joint penetrates the lead encapsulation and anode sheet on a second side of the electrochemical anode.

17. A method of making an electrochemical anode as defined in claim 14, wherein step (b) comprises the step of wrapping the anode sheet around the bus bar such that a top end of the anode sheet contacts a portion of the anode sheet located below the bus bar, wherein the first friction stir welded joint penetrates the top end and the portion of the anode sheet.

18. A method of making an electrochemical anode as defined in claim 14, wherein step (b) further comprises the steps of:
 forming the first friction stir welded joint as a fillet welded joint which penetrates the anode sheet and bus bar on a first side of the electrochemical anode; and
 forming a second friction stir welded joint as a fillet welded joint which penetrates the anode sheet and bus bar on a second side of the electrochemical anode.

19. A method of making an electrochemical anode as defined in claim 14, the method further comprising the step of:
 encapsulating the bus bar with lead; and
 sealing the anode sheet at each end using a friction stir welded joint located along an area where the bus bar and lead encapsulation meet.

20. A method of making an electrochemical anode as defined in claim 14, wherein the first friction stir welded joint is a butt welded joint which joins the bus bar and anode sheet.

21. A method of making an electrochemical anode as defined in claim 14, the method further comprising the steps of:
 forming the first friction stir welded joint as a butt welded joint which penetrates the anode sheet and bus bar on a first side of the electrochemical anode; and forming a second friction stir welded joint as a butt welded joint which penetrates the anode sheet and bus bar on a second side of the electrochemical anode.

22. A method of making an electrochemical anode as defined in claim 14, wherein the anode sheet is friction stir welded directly to the bus bar, the bus bar comprising copper.

23. A method of making an electrochemical anode as defined in claim 14, wherein the anode sheet is friction stir welded to an overlay encapsulating the bus bar, the bus bar comprising copper, and the overlay comprising lead.

24. A method of making an electrochemical anode as defined in claim 14, wherein the anode sheet is wrapped around the bus bar, and the wrapped anode sheet is friction stir welded to itself, thereby encapsulating the bus bar, the bus bar comprising copper.

25. A method of making an electrochemical anode as defined in claim 14, further comprising a filler material incorporated into a friction stir welded fillet joint between the anode sheet and the bus bar, the bus bar comprising copper, and the filler material comprising lead or a lead antimony alloy.

26. A method of making an electrochemical anode as defined in claim 14, wherein the anode sheet is attached to the bus bar using one or more friction stir butt welds, the bus bar comprising copper.

* * * * *